CARRIER SYSTEM SLOPE REGULATOR

Filed Oct. 15, 1965 Sheet 1 of 2

INVENTORS L. HOCHGRAF
S. O. RICE
BY R. B. Ardis
ATTORNEY 3,423,535
Patented Jan. 21, 1969

3,423,535

CARRIER SYSTEM SLOPE REGULATOR

Lester Hochgraf, Madison, and Stephen O. Rice, Summit, N.J., assignors to Bell Telephone Laboratories, Incorporated, New York, N.Y., a corporation of New York Filed Oct. 15, 1965, Ser. No. 496,725
U.S. Cl. 179—15 4 Claims
Int. Cl. H04j 1/06

ABSTRACT OF THE DISCLOSURE

Multichannel carrier signal transmission systems and more particularly automatic regulation of the level versus frequency response of such systems.

Many multichannel short-haul carrier telephone systems, such as the Bell System's type-N family of carrier systems, transmit a composite carrier signal which contains not only intelligence bearing sidebands but also at least some of the carriers themselves, at a substantially higher level than the sidebands. These carrier systems are normally equipped with dynamic flat-gain regulators which function to maintain the carriers at a constant level as long as they do not differ significantly in level among themselves. Since this is done by maintaining a substantially constant power level at the output of each repeater, a deviation of any of the individual carriers from their normal level causes a deviation by other carriers in the opposite direction, resulting in a noise impairment in the channels whose carrier level is reduced.

Deviations in the relative levels of the transmitted carriers can be described as being made up of several components related to the frequency assignment of the individual carriers. One of these, called "slope," has a constant rate of change of level with the difference in frequency assignment. Another, called "bulge," has a single inflection within the band where the rate of change of level with frequency is zero. Others, called "cubic" and "quartic," respectively, have two and three such inflection points. In the past, deviation regulators of the type shown in W. R. Lundry Patent 2,876,283, which issued Mar. 3, 1959, and J. B. Evans Patent 2,878,317, which issued Mar. 17, 1959, have been used to correct for these deviation components. They tend, however, to be quite complex and costly, for they require separate filtering of each transmitted carrier, weighting each carrier level separately in accordance with the order of the deviation component to be corrected, grouping and rectifying different weighted carriers, and summing the resulting D-C correcting signals with the proper algebraic signs for application to control the transmission through separate slope, bulge, cubic, and quartic equalizing networks. Such deviation regulators are highly effective, but their cost generally precludes the use of more than one on a single line.

A principal object of the present invention is to simplify the circuitry needed for regulating the level versus frequency response of a multichannel carrier signal transmission system in which at least some of the carriers are transmitted.

Another and more particular object is to regulate the level versus frequency response of such a system without using a large number of separate carrier filters and complex logic circuitry.

Still another object of the invention is to control the most important frequency dependent deviation component in a multichannel carrier signal transmission system with transmitted carriers in as simple a manner as possible.

The invention is based upon applicants' discovery that the largest deviation component, slope, in a carrier system of this type is quite closely proportional to the average frequency or zero-crossing rate of the composite carrier signal, i.e., the composite of the transmitted carriers and sidebands, and that the higher order deviation components have increasingly less effect on the average frequency or zero-crossing rate as the order of deviation increases. The invention takes advantage of these discoveries to provide effective first-order deviation regulation by regulating slope alone.

In accordance with the present invention, slope regulation is provided in a multichannel carrier signal transmission system in which at least some of the carriers, as well as the sidebands, are transmitted by inserting a single variable loss or equalizing network having a substantially linear loss versus frequency characteristic in the common path for all of the carriers and sidebands making up the composite carrier signal at a repeater point, detecting the average frequency or zero-crossing rate of the composite carrier signal, and varying the slope of the loss versus frequency characteristic of the equalizing network under the control of the frequency detecting apparatus.

Slope deviation is corrected in this manner with a high degree of accuracy and with little interaction from any higher order deviation components which may happen to be present.

A more complete understanding of the invention and its various features may be obtained from the following detailed description of a specific embodiment. In the drawings.

Although the invention is of general applicability, the slope regulator disclosed is specifically adapted for use with a commercial Bell System repeatered cable carrier system of the type-N family, typical members of which are the N1, N2 and ON systems. The N1 and N2 systems are 12 channel systems which employ double sideband transmitted carrier transmission, with the 12 channels spaced at 8 kilocycle intervals. The ON system is a 24 channel system which employs single sideband transmission, with the 24 channels spaced at 4 kilocycle intervals, and transmits only the carriers of alternate channels. All of the systems transmit similar composite carrier signals and make use of identical repeatered lines. Repeaters are spaced from 6 to 8 miles apart, and systems may extend up to several hundred miles in length. Dynamic flat-gain regulation is provided for the composite signal at each repeater point.

Figure 1:
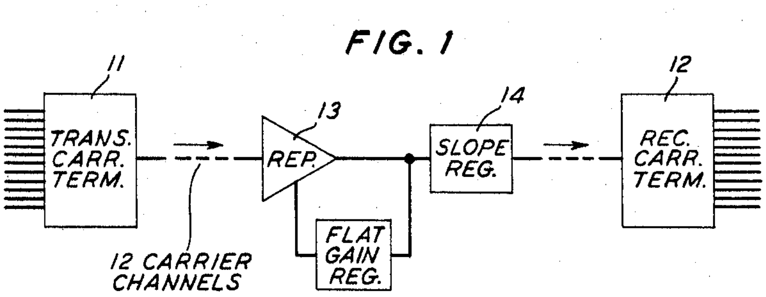
FIG. 1 is a general block diagram of a carrier system employing the present invention.

FIG. 1 is a block diagram of a portion of a Bell System N2 carrier system making use of the invention. Only one direction of transmission is shown. At the left, the contents of 12 voice channels are supplied to a standard transmitting carrier terminal 11, where they are modulated by carriers and the resulting group band of 12 carrier transmitted, double sideband carrier channels transmitted out over the carrier line. At the right, the incoming composite carrier signal from the line is received by a standard receiving carrier terminal 12, where the 12 carrier channels are demodulated and their voice frequency contents supplied to 12 outgoing voice channels. Each channel's level is at this point individually regulated in accordance with the level of the received carrier.

For simplicity, only one repeater point is illustrated in FIG. 1, although it is to be understood that the invention may be employed at as many repeater points as necessary. As shown, the repeater 13 is provided with dynamic flat-gain regulation which maintains the long-time power at its output substantially constant. The attenuation of the cable pairs over which the composite signal is transmitted varies with temperature, however, to produce not only a uniform variation in the received level of all carriers but also relative differences in received level between different carriers. When this happens, the channels whose carriers are at a lower level than others have a higher noise level at the output of the system than they would if their level remained normal because of the increased amount of amplification needed. Such deviations tend to accumulate, furthermore, along the length of the system and may become so large as to cause the levels of some channels to exceed the range of the individual channel regulators in receiving terminal 12. To avoid such problems, at least one slope regulator 14 is provided at a repeater point which makes use of the principles of the invention.

Figure 2:
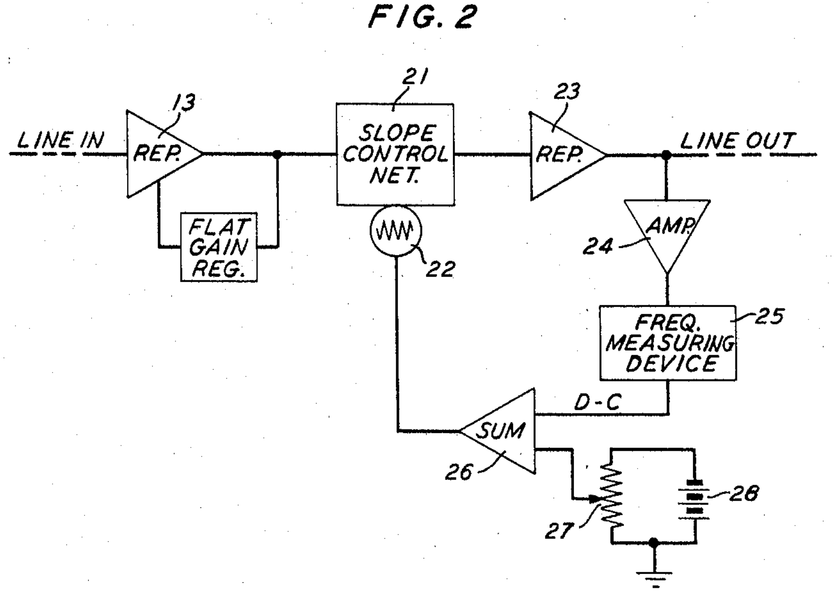
FIG. 2 is a block diagram of a repeater point in the system shown in FIG. 1.

FIG. 2 is a block diagram showing more detail of a repeater point in the carrier system shown in FIG. 1. In FIG. 2, the flat-gain regulated repeater 13 appears at the left. The output from repeater 13 is supplied to a single variable loss slope or equalizing network 21 which has a substantially linear loss versus frequency characteristic in the frequency band of interest. Network 21, which may take the form of the slope control network in the complete deviation equalizer shown in the above-identified Lundry and Evans patents, is controlled by a thermistor 22. The output from slope control network 21 is amplified by an additional line repeater 23 and transmitted out onto the carrier line.

In accordance with the invention, the entire frequency range of the composite carrier signal from repeater 23 is also supplied to a pick-off amplifier 24 and an average frequency or zero-crossing rate measuring device 25. Device 25 generates a direct voltage proportional to the detected average frequency or zero-crossing rate and may take the form of the analog frequency meter or zero-crossing rate detector disclosed in the article "An Analog Frequency Meter for Modern Measurements," which appears at pages 3 through 13 of the January-February 1961 issue of the General Radio Experimenter. Alternatively, device 25 may take the form of any of the average frequency or zero-crossing rate measuring devices disclosed in H. H. Scott Patent 2,362,503, which issued Nov. 14, 1944.

The D-C output of device 25 is, as shown in FIG. 2, applied to one input of a D-C summing amplifier 26. To permit manual adjustment of slope, the other input of summing amplifier 26 is supplied with a variable D-C bias. For simplicity, the variable bias is shown as coming from a potentiometer 27 connected across a D-C source 28. The output current from summing amplifier 26, finally, is supplied as heating current to slope network control thermistor 22.

Figure 4A:
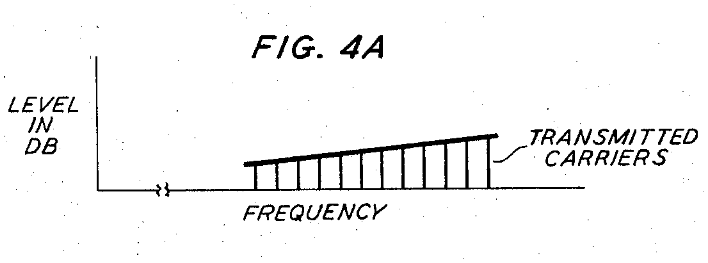
FIGS. 4A, 4B and 4C illustrate the manner in which the level versus frequency response of a carrier signal transmission system of the type described may have a slope component which is positive, negative, or substantially zero.
Figure 4B:
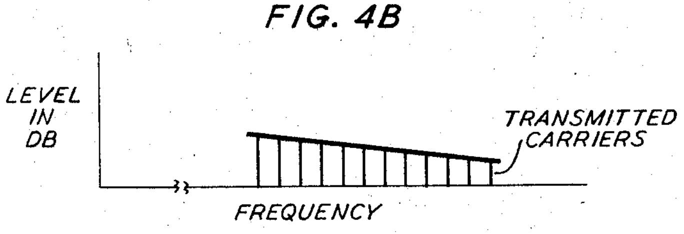
Figure 4C:
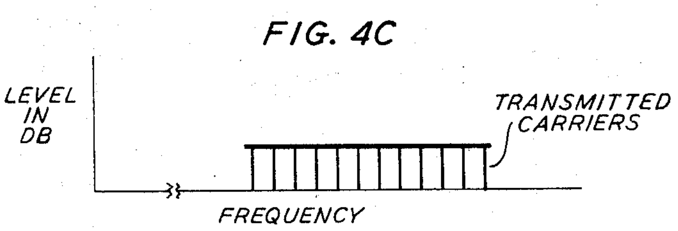

In operation, the slope regulator illustrated in FIG. 2 functions effectively to provide first order deviation correction. When, because of temperature or other effects on the line, the slope is positive (i.e., the transmitted carriers are high in level at the high frequency end of the spectrum), there is an increase in the average frequency or zero-crossing rate of the composite carrier signal. The D-C output of measuring device 25 and the heating current supplied to thermistor 22 both increase, causing a compensating positive slope to be imparted to the loss versus frequency characteristic of slope control network 21. In this manner a positive slope, illustrated for example in FIG. 4A, is corrected and the normal flat response illustrated in FIG. 4C restored. When the slope is negative (i.e., the transmitted carriers are high level at the low frequency end of the spectrum), there is a decrease in the average frequency or zero-crossing rate and the heating current supplied to thermistor 22 decreases, causing a compensating negative slope to be imparted to the loss versus frequency characteristic of network 21. In this manner, a negative slope of the type illustrated in FIG. 4B is corrected and the flat response shown in FIG. 4C restored.

Figure 3:
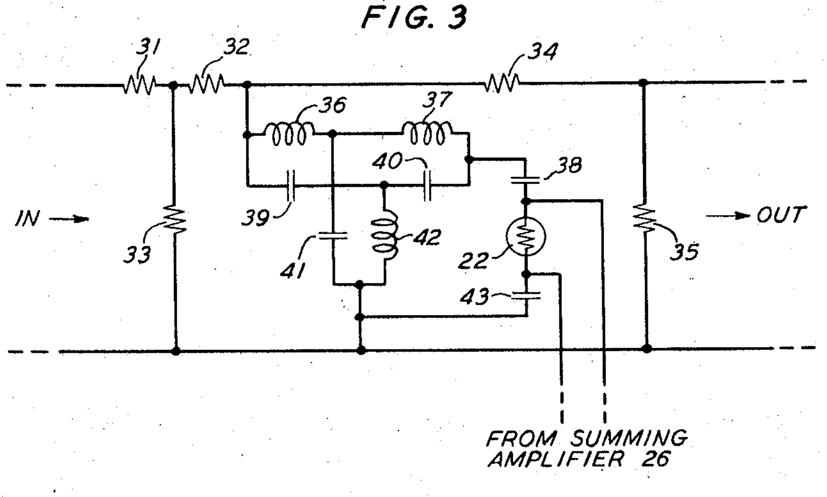
FIG. 3 is a schematic diagram of a slope equalizing network suitable for use in the embodiment of the invention shown in FIGS. 1 and 2.

FIG. 3 is a schematic of a thermistor-controlled slope adjusting network which may be employed as network 21 in the illustrated embodiment of the invention. Although FIG. 2 is a single-line diagram, it will be readily apparent to one skilled in the art how the full schematic shown in FIG. 3 is applicable.

As illustrated in FIG. 3, the slope control network includes an input resistance pad made up of a pair of series resistors 31 and 32 and a shunt resistor 33. An output pad is made up of a series resistor 34 and a shunt resistor 35, as shown. Between series resistors 32 and 34, the upper side of the line in FIG. 3 is connected through a pair of series inductors 36 and 37 and a D-C blocking capacitor 38 to one side of control thermistor 22. From the same point, the upper side of the line is also connected to blocking capacitor 38 through a pair of series capacitors 39 and 40. The junction between inductors 36 and 37 is returned to the lower side of the line through a capacitor 41, and the junction between capacitors 39 and 40 is returned to the lower side of the line through an inductor 42. The circuit is completed by a second D-C blocking capacitor 43 connected between the lower side of the line and the other side of control thermistor 32. Heating current from summing amplifier 26 in FIG. 2 is applied directly to thermistor 22 and is kept from the slope adjusting network itself by blocking capacitors 38 and 43.

The slope control network illustrated in FIG. 3 is an unbalanced parallel-T constant resistance all-pass network of the type illustrated in B. A. Kingsbury Patent 2,567,380, which issued Sept. 11, 1951. Appropriate design equations are given in the Kingsbury patent.

It is to be understood that the above-described arrangement is illustrative of the application of the principles of the invention. Numerous other embodiments may be devised by those skilled in the art without departing from the spirit and scope of the invention.

What is claimed is:

1. In a multichannel carrier signal transmission system in which at least some of the carriers as well as the sidebands are transmitted to form a composite carrier signal, said system including a transmission line and flat-gain regulated repeaters at spaced points along said line, a slope regulator for use at at least one of said repeater points for compensating for undesired slope with frequency in the relative levels of the transmitted carriers which comprises a variable loss network having a substantially linear loss versus frequency characteristic connected in a common path for all of the carriers and sidebands making up said composite carrier signal, means in said common path to detect the average frequency of said composite carrier signal, and means to vary the slope of the loss versus frequency characteristic of said network under the control of said frequency detecting means.

2. A slope regulator in accordance with claim 1 in which the average frequency of said composite carrier signal is determined by measuring the zero-crossing rate.

3. A slope regulator in accordance with claim 2 in which the slope of the loss versus frequency characteristic of said network is varied in the positive direction when the zero-crossing rate of said composite carrying signal increases and in the negative direction when the zero-crossing rate of said composite carrier signal decreases.

4. A slope regulator in accordance with claim 2 in which the slope of the loss versus frequency characteristic of said network is determined by the heating current flowing through a thermistor and in which the heating current supplied to said thermistor is varied under the control of the detected zero-crossing rate of said composite carrier signal.

References Cited

UNITED STATES PATENTS

| | | | |
|---|---|---|---|
| 2,231,538 | 2/1941 | Kreer. | |
| 2,362,503 | 11/1944 | Scott | 324—78 |
| 2,567,380 | 9/1951 | Kingsbury | 333—28 |
| 2,876,283 | 3/1959 | Lundry | 179—15 |
| 2,878,317 | 3/1959 | Evans | 179—15 |

RALPH D. BLAKESLEE, *Primary Examiner.*

U.S. Cl. X.R.

333—18, 28